July 11, 1961     A. FRACASSI     2,991,581
LOCKING SPRING-RETAINED FLY HOOK HOLDER
Filed May 10, 1960
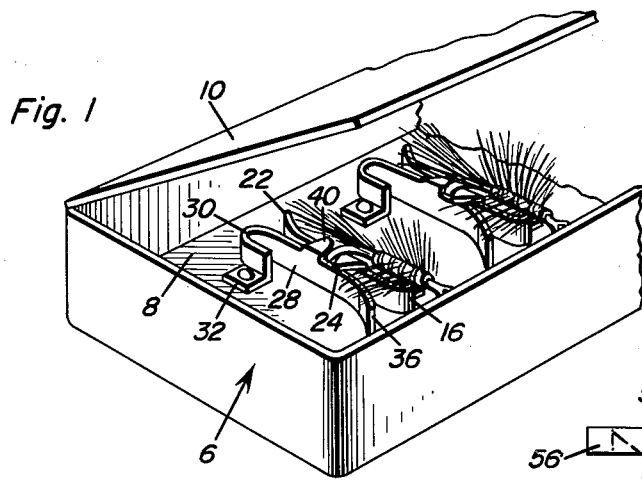
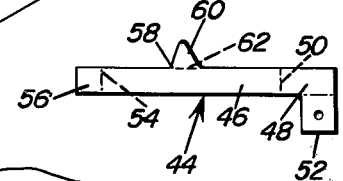
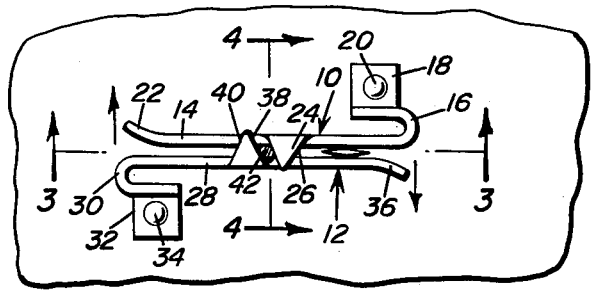
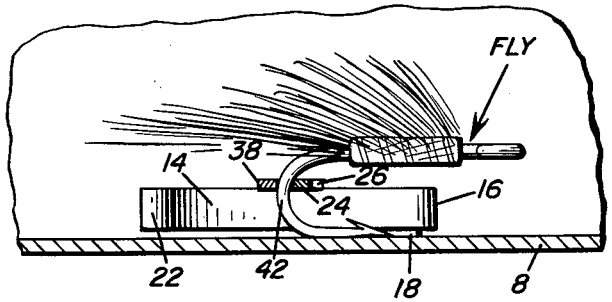
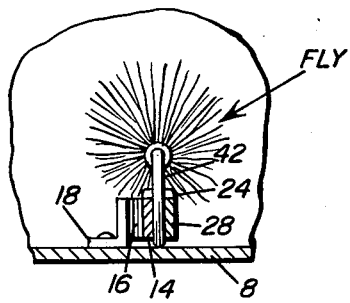
Avenire Fracassi
INVENTOR.
BY *Clarence A. O'Brien*
and *Harvey B. Jacobson*
Attorneys

United States Patent Office

2,991,581
Patented July 11, 1961

2,991,581
LOCKING SPRING-RETAINED FLY HOOK HOLDER
Avenire Fracassi, 15 Liberty St., Barre, Vt.
Filed May 10, 1960, Ser. No. 28,029
4 Claims. (Cl. 43—57.5)

This invention relates to an improved fly or fly hook holder which is expressly, but not necessarily, designed and adapted to be fixedly mounted within the confines of a fly box, and a general object is to structurally, functionally and otherwise improve on prior art holders and retainers used for the same purpose.

The holder or retainer herein revealed is such in construction that it will position and securely retain the fish hook of the fly, will facilitate the steps of inserting and removing the hook, will guard against accidental displacement of the same and will minimize the likelihood of damaging the hackle, feathers or other decorative components of the fly.

Briefly, the holder comprises a novel fish hook clasping and locking clip embodying a pair of leaf springs providing companion hook clamping fingers. These fingers are opposed to each other and spaced slightly apart so that the hook may be slid between the fingers from either end of the clip to assume a position at about the center of the over-all clip. The median or central portions of the fingers have novel hook positioning and retaining lugs or cams which are forced open to receive the hook and which automatically spring back to the normal locking state when the bend of the hook is seated vertically between said cams.

More specifically, the improved clip embodies a pair of opposed parallel closely or slightly spaced flexibly resilient leaf spring. These springs are positioned vertically with respect to the plane of the base or bottom. They are flexibly resilient and constitute resilient fingers between which the hooked end of the fish hook is positioned and held upright with the barbed point contacting the surface of the base. The fingers are arranged side by side or back to back. One finger has a springy outwardly directed return bend at one end and this end is fixed to a flat supporting member. The finger proper is unattached and is free to flex and it has a free end which is flared laterally or outwardly and serves as a hook guiding and piloting terminal. The other finger has a corresponding springy or resilient outwardly directed return bend opposite to the first-named free terminal end and it is also fixed to the same supporting member. Here again, the second finger proper is unattached and is also free to flex and has an outwardly flared free terminal end which constitutes a hook guiding and piloting member positioned opposite the first-named return bend. The median portions of the fingers have novel hook gripping and retaining cams which are such that the hook may be manually inserted from either entrance end of the clip.

More explicitly, the construction of the respective ends of the fingers is such that a generally U-shaped entrance is provided, making it easy to slip the hook end of the fish hook into position between the selected ends of the fingers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of a fly box, and two of the novel locking spring retained fly holders or clips in use.

FIG. 2 is a top plan view showing a fragmentary portion of the bottom or base of the box shown in FIG. 1 and presenting the details of construction of the over-all clip.

FIG. 3 is a section on the line 3—3 of FIG. 2, looking in the direction of the arrows.

FIG. 4 is a cross section on the line 4—4 of FIG. 2.

FIG. 5 is a plan view of the stamped out blank from which each leaf spring or resilient finger is made.

With reference to FIG. 1, the numeral 6 designates a fly box having a bottom 8 and a suitable lid or cover 10. This bottom 8 is here to be construed as a base inasmuch as the clip can obviously be carried on a suitable base other than the bottom of a fly box. For example, it is within the purview of the invention to mount clips of this type on an advertising display card or perhaps on a storage plate or the like in one's home. The base 8 is flat-faced. As seen in FIG. 2, the fly holder embodies a pair of companion duplicate leaf springs which constitute elongated resilient clamping fingers or grips 10 and 12. These fingers are alike in construction but will nevertheless be described individually. The body portion or finger proper 14 is flat-faced and elongated and the right hand end thereof is formed with a return bend 16 which constitutes a tensioning spring. This tensioning spring has an outstanding ear 18 which is riveted or otherwise secured at 20 to the base 8. The other end of the finger is free and flared outwardly, as at 22, to provide one component of the entrance or mouth for the hook. The lug 24 is approximately triangular in plan and it is formed integrally and is bent at right angles to the plane of the finger and is therefore parallel to the surface of the base. The marginal edges thereof are tapered, as at 26 to provide cam surfaces.

The finger 12 is of duplicate construction and the body portion is denoted at 28 and the return bend at 30 constituting a tensioning spring or anchor and is provided with an outstanding anchoring ear 32 riveted or otherwise secured in place at 34. The free terminal end at the right is flared outwardly as at 36. Here the lug is denoted at 38 and the tapering edges or cam surfaces at 40. With the two fingers placed back to back or side by side a minimal space exists therebetween, sufficient to accommodate the hooked end 42 of the hook portion of the fly. The tip of the cam or lug 24 extends over the upper edge portion of the finger 28 and, by the same token, the cam or lug 38 with its cam surfaces 40 extends over the median portion of the first-named finger 14. Adjacent cam surfaces of the lugs provide a space therebetween in which the portion of the hook 42 is removably lodged and held in the manner seen in FIG. 2.

The cam surfaces or end thrust surfaces 26 and 40 may be approximately 45 degrees. Assuming that the hook is to be stored it is slipped, for instance, into the right hand entrance in FIG. 2 and finds its way by reason of the curved return bend 16 on one side and the flared end portion 36 on the other. These surfaces pilot the hooked end of the fish hook into the initial position and when the crest of the bent portion 42 engages the bevel 26 it rides laterally slightly, presses the finger 28 open, allowing the bend to clear the cam or lug and seat itself between the two cams 24 and 40 in the manner illustrated. Experience has shown that in the course of inserting or removing a hook it is sometimes necessary to give the shank of the hook a slight forcible turn to assume an angle but, obviously, trial and error will show the user how best to utilize the over-all clip whether the insertion is made from the right hand end or the left hand end in FIG. 2.

This invention accomplishes the purpose of absolutely securing a hook once placed between the springs and completely prevents any possibility of the hook becoming loose in the box or container in which it is carried; as is the satuation with the ordinary fly boxes. Another purpose accomplished by this type of spring lock is that the hook is kept upright and the wings, tails and other decorative parts of the fly are protected and not deranged as is the case with ordinary coil springs or flat pressure springs which are used to secure flies. This holder will hold either wet or dry flies and will not crush the hackle, tails or wings or the like. This spring clip can be made out of steel or other metal or components that have a springy or flexibly resilient property such as steel, when constructed and mounted in the manner above disclosed.

One way of manufacturing a finger is shown in FIG. 5. Here a simple spring steel stamped-out-blank 44 is provided, the finger portion being denoted at 46, the return bend at 48, this part being bendable on the fold line 50. The lateral attaching ear is denoted at 52. The dotted line 54 at the left defines the laterally bent tip or flared piloting end 56. The centrally disposed projecting lug is here denoted at 58 and the edge at 60 and the fold line at 62.

Other manufacturing procedures, not shown, will be resorted to in actual practice.

It may be added that the material must possess the necessary inherent flexibly resilient properties and should be non-corrodible but need not necessarily be spring steel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder for use in a fly box comprising a fish hook clasping and retaining clip embodying a first elongated leaf spring providing a finger one end of which is fixed on a relatively stationary support, the other end of said finger being free and flared laterally, a second elongated leaf spring providing a companion finger and opposed to, and paralleling said first leaf spring and also having one end fixed on said support with the other end free and flared laterally in a direction opposite to the first-named flared end, said spring fingers serving to permit a hook of a fishing fly to be interposed and yieldingly clamped between said spring fingers, and coacting hook positioning and retaining cams lateral to and integral with median portions of the respective spring fingers, said cams being contiguous to each other and serving to grip but releasably retain cooperating portions of the fish hook securely between said fingers and cams.

2. A holder for a fish hook comprising, in combination, a stationary support having a flat surface, a fish hook clasping and retaining clip embodying a first elongated substantially straight flexibly resilient leaf spring providing a hook clamping finger and having one end fixed on said support, the other end being free, movable and flared laterally, a hook retaining cam on a median portion of an upper lengthwise edge of the finger and extending in a plane at right angles to said finger, a second flexibly resilient leaf spring corresponding to said first spring and confronting and parallel to said first spring and providing a companion clamping finger and also having one end fixed on said support adjacent to the flared end of the first finger and its other end free, movable and flared laterally at a point adjacent the fixed end of the first finger, said fingers being normally close together but capable of being forcibly spread apart, and a second hook retaining cam on a median portion of an upper lengthwise edge of said second finger and likewise extending at right angles thereto, said cams bridging the space between the fingers, being close together and cooperating with the fingers to spread them apart and then to hold the hook shank therebetween with the curved portion between the fingers.

3. A holder for a fish hook comprising, in combination, a stationary support having a flat surface, a fish hook clasping and retaining clip embodying a first elongated substantially straight flexibly resilient leaf spring providing a hook clamping finger and having one end fixed on said support, the other end being free, movable and flared laterally, a hook retaining cam on a median portion of an upper lengthwise edge of the finger and extending in a plane at a right angle to said finger, a second flexibly resilient leaf spring corresponding to said first spring and opposed and parallel to said first spring, and providing a companion clamping finger and also having one end fixed on said support adjacent to the flared end of the first finger and its other end free, movable and flared laterally at a point adjacent the fixed end of the first finger, said fingers being normally close together but capable of being forcibly spread apart, and a second hook retaining cam fixed on a median portion of an upper lengthwise edge of said second finger and likewise extending at a right angle thereto, the cam on the first finger being directed toward the second finger, bridging the space between the fingers and having a free tip portion overlying an adjacent portion of the upper edge of the second finger, the cam of the second finger being directed toward the first finger, bridging the space between the fingers and likewise having a free tip portion overlying an adjacent portion of an upper edge of the first finger, adjacent marginal edges of said cams being in proximity to each other, said cams cooperating with the fingers in a manner to spread the fingers apart and then to hold the hook shank between with the curved portion between the fingers.

4. The structure defined in claim 3, and wherein said cams are provided with contiguous marginal edges defining selectively usable cam surfaces whereby when the fish hook is grasped and intentionally extracted from its retained position from left to right or vice versa the cam which is being acted on again cooperates with the fingers to spread them apart and to release the hook.

References Cited in the file of this patent

UNITED STATES PATENTS

| | | |
|---|---|---|
| 1,856,990 | Frank | May 3, 1932 |
| 1,911,262 | Athon | May 30, 1933 |
| 2,857,706 | Skains | Oct. 28, 1958 |
| 2,899,770 | Bartlett | Aug. 18, 1959 |

FOREIGN PATENTS

| | | |
|---|---|---|
| 123,444 | Australia | Jan. 29, 1947 |
| 584,102 | Great Britain | Jan. 7, 1947 |